United States Patent [19]

Winiasz

[11] Patent Number: 4,638,906
[45] Date of Patent: Jan. 27, 1987

[54] CONVEYOR ASSEMBLY

[75] Inventor: Michael E. Winiasz, Lorain, Ohio

[73] Assignee: Harris Graphics Corporation, Melbourne, Fla.

[21] Appl. No.: 799,402

[22] Filed: Nov. 19, 1985

[51] Int. Cl.$^4$ .................. B65G 17/12; B65G 39/20; B65G 47/86
[52] U.S. Cl. .................. 198/803.9; 104/172.5; 59/85; 474/211; 198/845; 198/850
[58] Field of Search ............ 198/845, 850, 852, 470.1, 198/803.9, 853, 803.7, 683, 465.4, 469.1; 104/172 C, 172 B, 172 S, 172 R, 140; 474/203, 206, 210, 211; 59/85, 84, 78

[56] References Cited

U.S. PATENT DOCUMENTS

| | | | |
|---|---|---|---|
| 1,407,673 | 2/1922 | Roe | 104/172 C |
| 2,646,160 | 7/1953 | Michna | 198/845 |
| 3,983,990 | 10/1976 | Gardy et al. | 198/852 |
| 4,294,345 | 10/1981 | Stauber et al. | 198/683 |
| 4,320,894 | 3/1982 | Reist et al. | 198/803.7 |
| 4,381,056 | 4/1983 | Eberle | 198/803.7 |
| 4,512,457 | 4/1985 | Reist et al. | 198/470.1 |

FOREIGN PATENT DOCUMENTS

| | | | |
|---|---|---|---|
| 571552 | 3/1959 | Canada | 198/845 |
| 1206228 | 12/1965 | Fed. Rep. of Germany | 474/211 |
| 146274 | 2/1981 | German Democratic Rep. | 104/172 C |
| 211957 | 2/1924 | United Kingdom | 59/85 |

Primary Examiner—Joseph E. Valenza
Assistant Examiner—Daniel R. Alexander
Attorney, Agent, or Firm—Yount & Tarolli

[57] ABSTRACT

A gripper conveyor assembly includes a plurality of grippers. A conveyor chain moves the grippers along a track from a pick up station to a receiving station. The conveyor chain has identical links. Any one link can be removed from the chain while all of the other links remain interconnected and enclosed by the track. Each of the links includes a body section with rollers which engage the track to guide movement of the body section along the track. Plug and socket type universal joints interconnect the body sections of the links. An opening having a length corresponding to the length of the body section of a link is provided in the track. When a link is rotated, through approximately 90° at the opening, the plug and socket joints can be disconnected and the rotated link removed from the conveyor chain.

4 Claims, 11 Drawing Figures

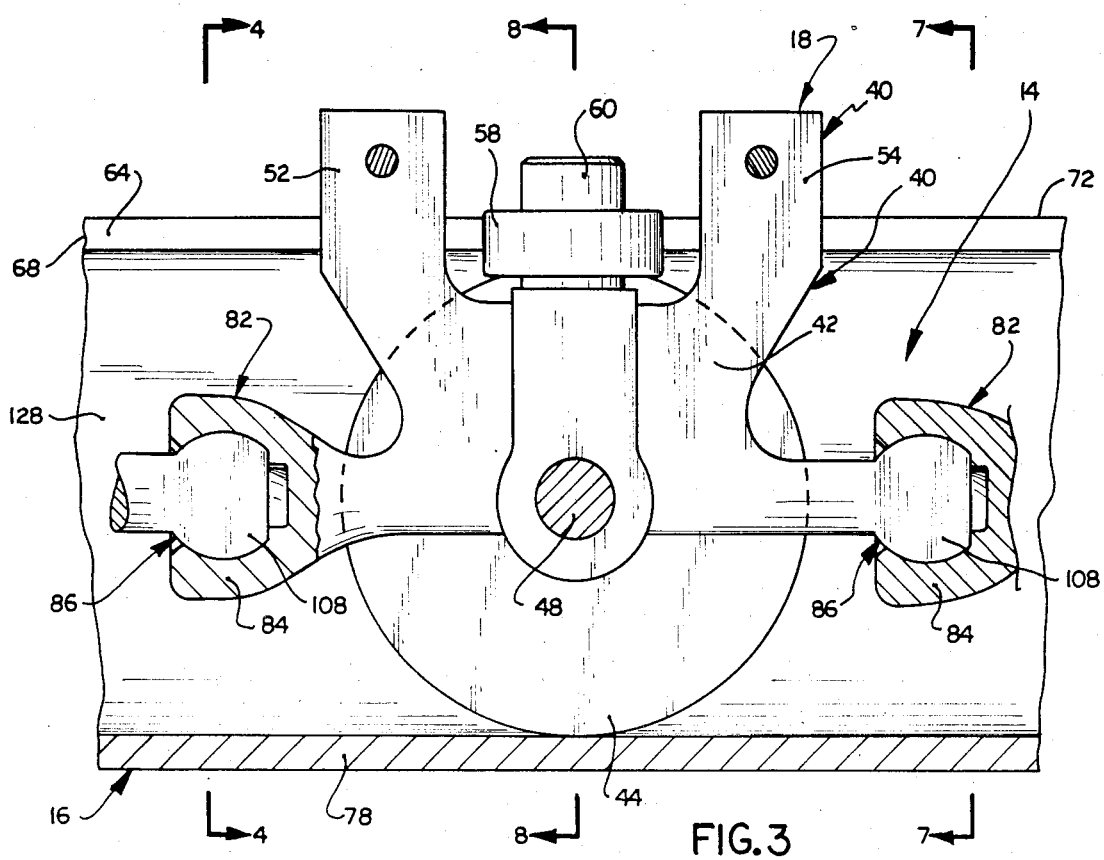
FIG.3
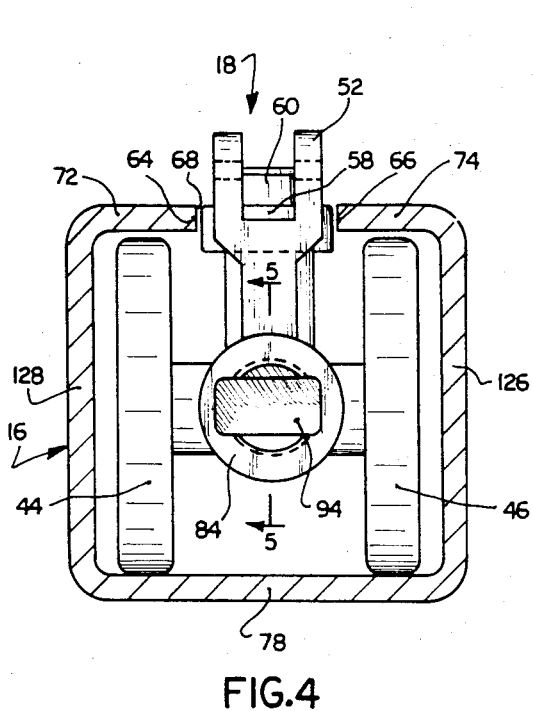
FIG.4
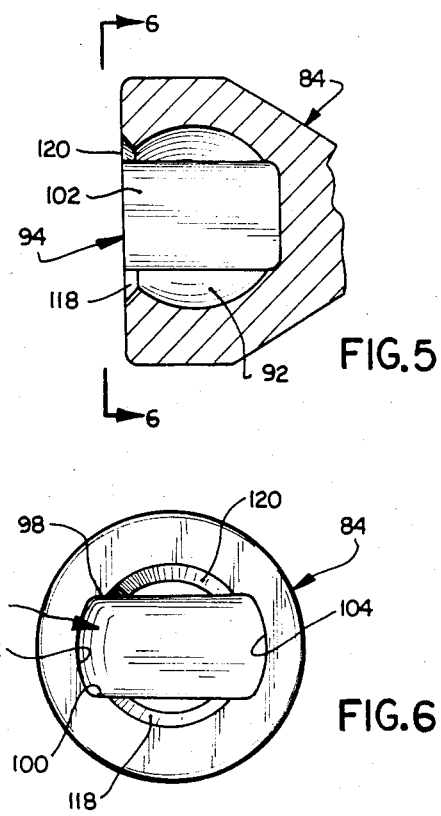
FIG.5
FIG.6

CONVEYOR ASSEMBLY

BACKGROUND OF THE INVENTION

The present invention relates to a new and improved conveyor assembly and more specifically to a conveyor assembly having a plurality of article-engaging grippers connected with a conveyor chain.

A conveyor assembly for transporting articles, such as sheet material, from one location to another is disclosed in U.S. Pat. No. 4,294,345. The conveyor assembly disclosed in this patent includes a conveyor chain to which the grippers are connected. The conveyor chain includes a plurality of links which are connected at swivel joints. The conveyor chain links are provided with wheels which guide movement of the conveyor chain along a track. The links are interconnected in such a manner as to require extensive disassembly in order to replace one of the links and/or grippers.

SUMMARY OF THE INVENTION

The present invention provides a new and improved conveyor assembly having a conveyor chain with links which can be readily removed to facilitate replacement of a defective link or gripper. The links are interconnected by plug and socket type universal joints. In order to remove a link and/or gripper from the conveyor chain, the link to be removed from the chain is merely rotated at an opening in the track. This enables universal joints at opposite ends of the rotated link to be released from the adjacent links. The link can then be removed from the conveyor chain. The other links in the conveyor chain remain interconnected and enclosed by a track.

Accordingly, it is an object of this invention to provide a new and improved gripper conveyor assembly having a conveyor chain with a plurality of links, each of which can be readily removed from the conveyor chain while other links in the chain remain interconnected.

BRIEF DESCRIPTION OF THE DRAWINGS

The foregoing and other objects and features of the present invention will become more apparent upon a consideration of the following description taken in connection with the accompanying drawings wherein:

FIG. 3 is an enlarged elevational view of one of the conveyor chain links of FIG. 2;

FIG. 4 is an elevational view, taken generally along the line of 4—4 of FIG. 3, illustrating an open end of a socket disposed at one end of a conveyor chain link;

FIG. 5 is an enlarged cross sectional view, taken generally along the line 5—5 of FIG. 4, illustrating the configuration of a plug receiving chamber in the socket;

FIG. 6 is an end view, taken generally along the line 6—6 of FIG. 5, further illustrating the open end of the socket;

DESCRIPTION OF ONE SPECIFIC PREFERRED EMBODIMENT OF THE INVENTION

Conveyor Assembly

Figure 1:
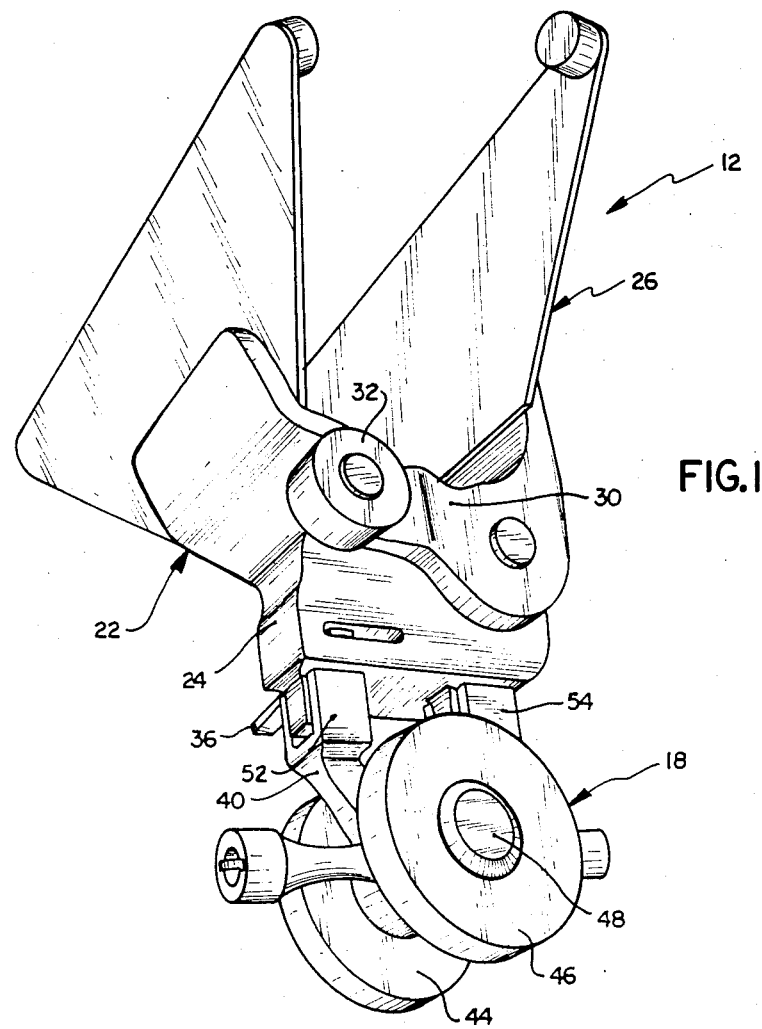
FIG. 1 is a pictorial illustration of a gripper assembly and a conveyor chain link constructed in accordance with the present invention.

A conveyor assembly 10 (FIG. 2) constructed in accordance with the present invention includes a plurality of gripper assemblies 12 which are connected with a conveyor chain 14. The conveyor chain 14 is movable along a track 16 which extends from a pickup station (not shown) to a receiving station (not shown) and then back to the pickup station. Although only three links 18 of the conveyor chain 14 have been shown in FIG. 2, it should be understood that a relatively large number of identical links 18 are interconnected to form a continuous conveyor chain.

Gripper assemblies 12 (FIGS. 1 and 2) are connected to every other link 18 and are used to grip articles to be transported between the pickup and receiving stations. The gripper assemblies 12 have been shown in FIGS. 1 and 2 as opening upwardly. This enables articles, such as newspapers, to be sequentially dropped downwardly into the open gripper assemblies. After the conveyor chain 14 has moved around one or more curves in the track 16, the gripper assemblies 12 face downwardly. The downwardly facing gripper assemblies 12 are sequentially opened at the receiving station to drop the articles transported from the pickup station.

Since the links 18 and the gripper assemblies 12 are of identical construction, if a gripper assembly should, for some unforeseen reason, become defective, it is merely necessary to remove the defective gripper assembly and its associated link from the conveyor chain 14 and replace it with a properly functioning gripper assembly and link. Since the identical links 18 are releasably interconnected with the gripper assemblies 12, it is necessary to maintain only a relatively small inventory of replacement links 18 and gripper assemblies 12. Of course, if a chain link 18 which is not connected with a gripper assembly 12 becomes defective, the defective chain link can be replaced by another chain link which is not connected with a gripper assembly.

Gripper Assembly

The gripper assembly 12 includes a stationary clamp arm 22 (FIGS. 1 and 2) which is fixedly connected to a base section 24 of the gripper assembly. A movable clamp arm 26 is pivotally mounted on the base section 24.

Figure 2:
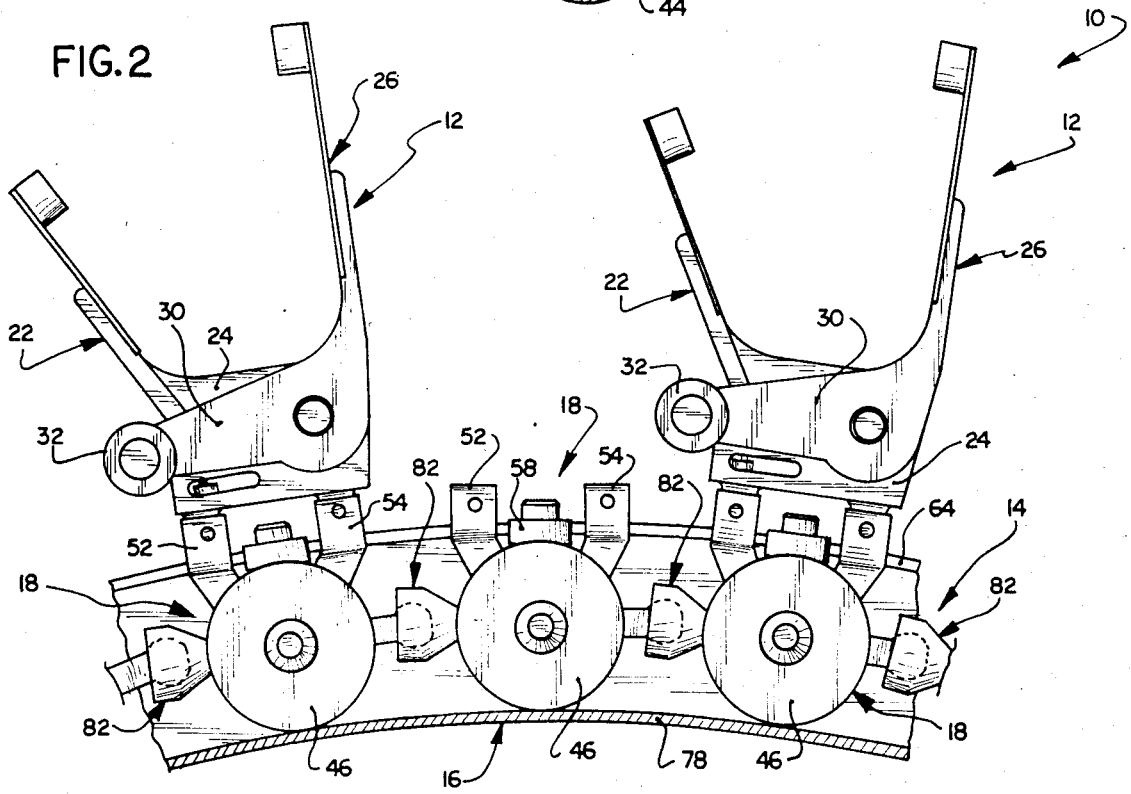
FIG. 2 is an illustration, on a reduced scale, depicting the manner in which a plurality of chain links are interconnected to form a conveyor chain which is enclosed by a track.

The gripper assembly 12 is illustrated in FIGS. 1 and 2 in a fully open condition. In order to grip an article, the movable clamp arm 26 is rotated toward the stationary clamp arm 22. To rotate the movable clamp arm 26, a roller 32 on an actuator arm 30 engages a stationary cam. This rotates the movable clamp arm 26 in a counterclockwise direction (as viewed in FIG. 2) as the conveyor chain 14 moves the gripper assembly 12 in a leftward direction (as viewed in FIG. 2) past the stationary cam.

Once the gripper assembly 12 has engaged an article at a pickup station, it remains in a closed condition firmly gripping the article. Movement of the conveyor chain 14 along the track 16 moves the closed gripper assembly 12 and the engaged article from a pickup station to a receiving station. At the receiving station, an actuator lever 36 (FIG. 1), projecting from a side of the gripper assembly opposite from the actuator arm 30, engages a stationary abutment. Engagement of the actuator lever 36 with the stationary abutment releases the gripper assembly 12 for movement back to the fully open condition of FIG. 2 under the influence of a biasing spring. Although the gripper assembly 12 could have many different constructions, such as the construction shown in U.S. Pat. No. 4,381,056, one preferred embodiment of the gripper assembly 12 has the construction shown in U.S. patent application Ser. No. 790,431, filed 10-23-85, by Michael E. Winiasz and entitled "Gripper Assembly".

Conveyor Chain Links

Each of the identical chain links 18 includes a one-piece cast metal body section 40 (FIG. 3) having a main or central portion 42. A pair of rollers 44 and 46 (FIGS. 1 and 4) are disposed on opposite sides of the central portion 42 of the body section 40. The rollers 44 and 46 are rotatably supported on an axle 48 (FIG. 3) which extends through the link 18.

A pair of upwardly extending mounting brackets 52 and 54 are provided on the body section 40. The brackets 52 and 54 receive downwardly projecting flanges on the base 24 of a gripper assembly 12 (FIGS. 1 and 2). The gripper assembly 12 is releasably connected with the chain link 18 by suitable pins which extend through holes formed in the brackets 52 and 54 and in the downwardly extending projections on the base section 24 of the gripper assembly 12. Of course, many other known types of fastening arrangements could be used to connect the gripper assembly 12 and conveyor chain link 18 if desired.

Figure 8:
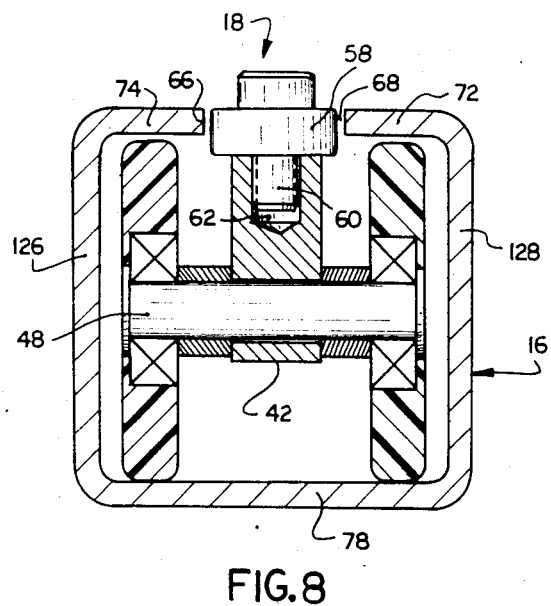
FIG. 8 is a sectional view, taken generally along the line 8—8 of FIG. 3, illustrating rollers which guide movement of a link along the track.

A guide roller 58 (FIG. 3) is rotatably supported on a pin 60 which is received in a socket 62 (FIG. 8) formed in the body section 42 of the link 18. The roller 58 engages opposite side surfaces 64 and 66 of a slot 68 (FIGS. 4 and 9) formed between longitudinally extending guide sections 72 and 74 of the track 16.

During movement of the chain links 18 along the track 16, the rollers 44 and 46 roll on either a main section 78 of the track or on the guide sections 72 and 74 of the track 16. When the gripper assemblies 12 are in the upwardly facing orientation shown in FIG. 2, the rollers 44 and 46 will roll along an inner side surface on the main section 78 of the track 16. However, when the gripper assemblies 12 face downwardly, the rollers 44 and 46 roll along inner side surfaces on the guide sections 72 and 74 of the track 16. Regardless of which orientation the gripper assembly 12 is in, that is either an upwardly facing or a downwardly facing orientation, the rollers 58 on the links 18 cooperate with the slot 68 to guide movement of the links along the track 16.

To enable the conveyor chain 14 to flex as it goes around curves, universal joints 82 (FIG. 2) are provided between adjacent links. The universal joints 82 are formed by sockets 84 at the leading ends of the links 18 and plugs 86 at the trailing ends of the links. The socket 84 at one end of a link 18 receives a plug 86 of an adjacent link. Similarly, the plug 86 at the opposite end of a link 18 is received in a socket 84 of an adjacent link. The plugs and sockets 84 and 86 are free to swivel and tilt in any direction to provide a limited range of universal freedom of movement of one link 18 relative to an adjacent link.

Each of the sockets 84 (see FIG. 5) includes a spherical cavity 92 in which a plug 86 of an adjacent link is received. The spherical cavity 92 has an opening 94 with a configuration corresponding to the cross sectional configuration of a plug 86. Thus, the opening 94 has a generally rectangular configuration with flat side surfaces 98 and 100 (FIG. 6) which are interconnected by arcuate surfaces 102 and 104. Each of the plugs 86 has a pair of flat parallel side surfaces 108 and 110 (FIG. 7) which are interconnected by arcuate side surfaces 112 and 114. The arcuate side surfaces 112 and 114 form portions of a sphere having a diameter which is slightly smaller than the diameter of the spherical inner side surfaces of the socket cavity 92.

Figure 7:
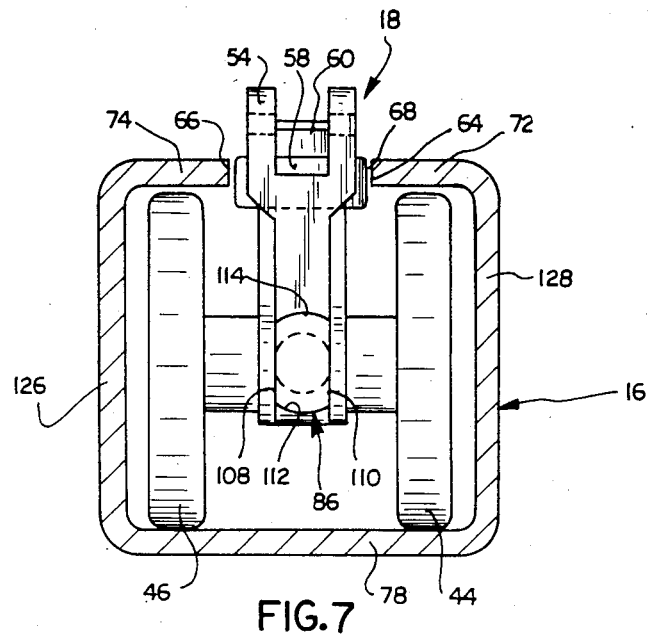
FIG. 7 is an end view, taken generally along the line 7—7 of FIG. 3, illustrating a plug disposed at one end of the conveyor chain link of FIG. 4.

When a plug 86 is to be inserted into a socket cavity 84 to interconnect a pair of links, the plug and socket are oriented relative to each other with the flat side surfaces 98 and 100 on the socket opening 94 aligned with the flat side surfaces 108 and 110 of the plug 86 (FIGS. 6 and 7). Since the opening 94 is slightly larger than the plug 86, the plug can be inserted into the socket chamber 92 through the opening 94 (FIGS. 5 and 6). Once this has been done, the socket and plug 84 and 86 are rotated relative to each other through 90°. This results in the spherical side surface areas 112 and 114 on the plug being disposed in engagement with the spherical side surface of the socket chamber 92.

Once the plug 86 has been inserted into the socket 84 and rotated, the flat side surfaces 108 and 110 on the plug will be offset by 90° from the flat side surfaces 98 and 100 of the socket opening 94. Therefore, the plug 86 is held in the socket cavity 92. The opening 94 to the socket cavity flares outwardly at 118 and 120 to enable the plug 86 and socket 84 to be rotated relative to each other about their central axes and simultaneously tilted in any direction.

To disconnect a link 18 at a universal joint 82, it is necessary to rotate the plug 86 and socket 84 relative to each other. The rotation is stopped when the flat side surfaces 108 and 110 on the plug are aligned with the flat side surfaces 98 and 100 on the socket 84. The plug 86 can then be moved axially out of the socket 84.

Replacement of a Link

In accordance with a feature of the invention, any one of the numerous links 18 in the conveyor chain 14 can be readily replaced while the other links in the conveyor chain remain interconnected and enclosed by the track 16. This enables a defective link 18 or a defective link and gripper assembly 12 to be quickly and easily replaced. Thus, if a gripper assembly 12 should fail to operate in a desired manner, it is merely necessary to remove the link 18 to which the defective gripper assembly is connected from the conveyor chain 14. Similarly, if one of the links 18 which is not attached to a gripper assembly 12 becomes defective, the defective link can be readily removed from the conveyor chain 14.

To disconnect a selected link 18a (FIG. 9) and its associated gripper 12 from the conveyor chain 14, the selected link is moved along the track 16 to a position in which the link is aligned with a rectangular opening 124 in a side wall 126 of the track 16 and in the guide wall 74 of the track 16. In the embodiment of the invention illustrated in FIG. 9, the opening 124 is disposed on the outside of a curve around which the conveyor chain 14 extends. Since the opening 124 is in the outside of the curve, the side wall 126 of the track 16 is of minimal importance in guiding movement of the links 18. Thus, an inner side wall 128 of the track 16 and inner guide surface 64 of the slot 68 are primarily effective in guiding movement of the links 18 around the curve. Of course, the opening 124 could be formed in the track 16 at a location other than along a curve if desired.

Figure 9:
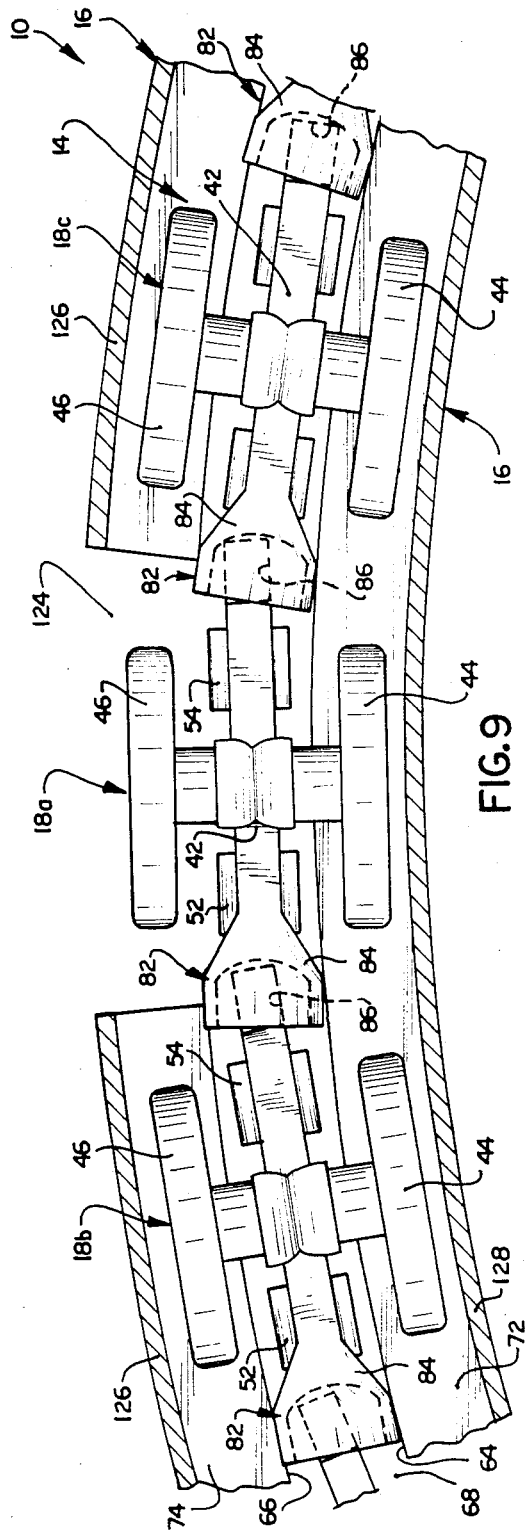
FIG. 9 is a bottom plan view illustrating the relationship between conveyor chain links and an opening in the track.
Figure 11:
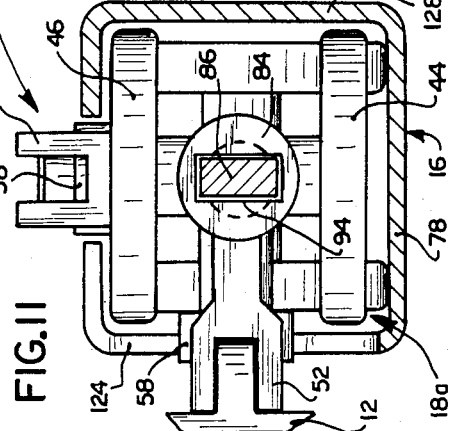
FIG. 11 is an elevational view further illustrating the relationship between the track, the link which has been rotated for removal from the conveyor chain, and an adjacent link.
Figure 10:
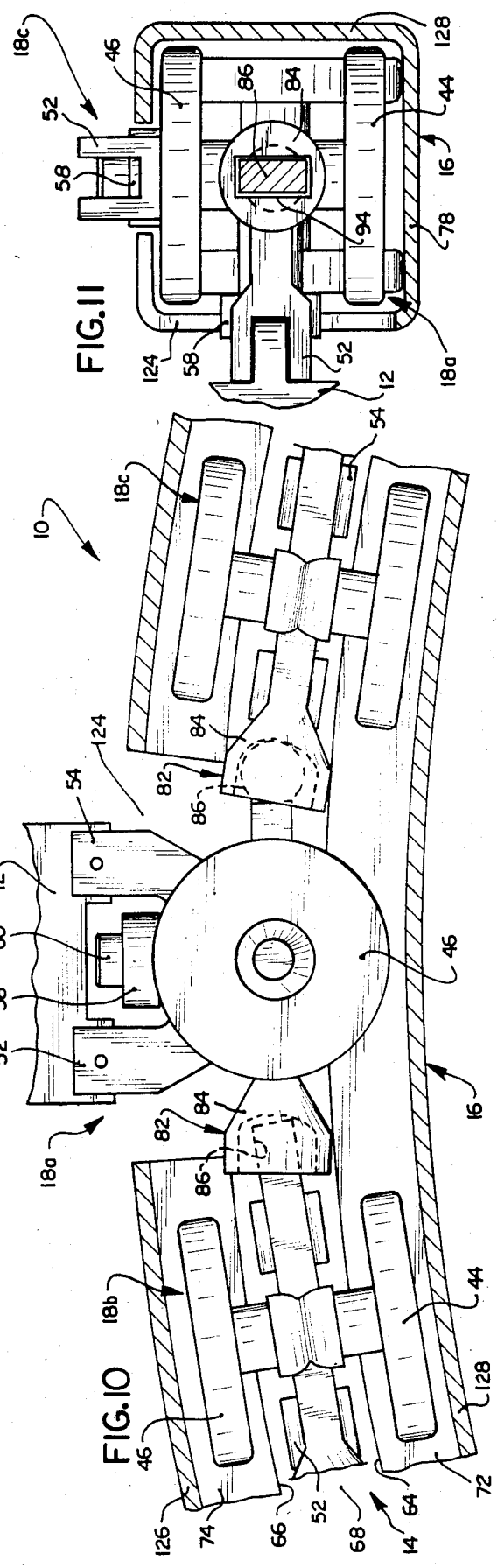
FIG. 10 is a bottom plan view, generally similar to FIG. 9, illustrating the manner in which a selected conveyor chain link is rotated about a central axis of the track to enable the selected link to be disconnected from adjacent links.

After the selected link 18a which is to be removed from the conveyor chain 14 has been aligned with the opening 124, the link is rotated through 90° about the central axis of the track 16 from the normal position of FIG. 9 to the disconnect position of FIGS. 10 and 11. This moves the socket 84 on the selected link 18a relative to the plug 86 on the preceding link 18b. In addition, this rotates the plug 86 on the selected link 18a relative to the socket 84 on the succeeding link 18c. Once the selected link 18a has been rotated through 90° relative to the adjacent links, the flat side surfaces on the plugs 86 of the universal joints 82 connecting the selected 18a link with the adjacent links 18b and 18c are aligned with the flat side surfaces of the openings 94 in the sockets 84 of the universal joints.

When the selected link 18a is in the disconnect position of FIGS. 10 and 11, it can be removed from conveyor chain 14 by merely disconnecting the universal joints 82 at opposite ends of the selected link. This can be done by pulling rearwardly, that is toward the right as viewed in FIG. 10, on the selected link 18a while pushing forwardly, that is toward the left as viewed in FIG. 10, on the preceding link 18b. The clearance between the numerous links 18 and the track 16 and between components of the many universal joints 82 in the conveyor chain 14 allows the selected link 18a to move rearwardly to disengage its socket 84 from the plug 86 of the preceding link 18b. The selected link 18a is then pivoted into the opening 124 and the plug 86 of the selected link is removed from the socket 84 on the trailing link 18c. The selected link 18a, with a gripper assembly 12 attached thereto, can be completely disconnected from the conveyor chain 14 while the other links in the conveyor chain remain connected with each other enclosed by the track 16.

A new link 18 can then be inserted into the conveyor chain 14. If the link which was removed from the conveyor chain 14 was connected with a gripper assembly 12, the new link would also be connected with a gripper assembly. Of course, if the link 18 removed from the conveyor chain 14 was not connected with a gripper assembly 12, the new link would not be connected with a gripper assembly.

To install the new link 18 in the conveyor chain 14, the plug 86 at one end of the new link is inserted through the track opening 124 and into the socket 84 of the link 18c while the new link is offset by 90° from the link 18c. The socket 84 at the opposite end of the new or replacement link 18 can then receive the plug 86 of the preceeding link 18b. The replacement link is then be rotated through 90° relative to the track 16 and the adjacent links 18a and 18c of the conveyor chain 14. This moves the replacement link 18 from the disconnect position of FIG. 10 to the normal operating position shown in FIG. 9.

As the replacement link 18 is rotated to the normal operating position, the socket 84 on the replacement link is rotated relative to the plug 86 of the leading adjacent link 18b to interconnect the replacement link and the leading link. Similarly, the plug 86 on the replacement link 18 is rotated relative to the socket 84 on the trailing adjacent link 18c to interconnect the replacement link and the trailing link. Once this has been done, the links 18 of the conveyor chain 14 are again connected in a closed loop.

Conclusion

The present invention provides a new and improved gripper conveyor assembly 10 having a conveyor chain 14 with links 18 which can be readily removed from the conveyor chain to facilitate replacement of a defective link or gripper 12. The links 18 are interconnected by plug and socket type universal joints 82. In order to remove a link 18 or gripper 12 from the conveyor chain 14, the body section 42 of the link 18 to be removed from the chain is merely rotated at an opening 124 in the track 14. This enables the universal joints at opposite ends of the rotated link 18 to be released from the adjacent links. The rotated link 18 can then be removed from the conveyor chain 14. The other links 18 in the conveyor chain 14 remain interconnected and enclosed by the track 16.

Having described one specific preferred embodiment of the invention, the following is claimed:

1. A gripper conveyor assembly comprising a plurality of gripper means for engaging articles to be conveyed from a first location to a second location, a track extending from the first location to the second location, a conveyor chain connected with said gripper means and movable along said track, said conveyor chain being enclosed by said track and including a plurality of interconnected links anyone of which can be readily removed from said conveyor chain while the other links remain interconnected and are enclosed by said track, one of said links including a body section connected to one of said gripper means, roller means connected with said body section of said one link for engaging said track to guide movement of said body section along said track, socket means at a first end portion of said body section for receiving a plug of an adjacent link, and a plug at a second end portion of said body section for insertion into a socket means of an adjacent link, said socket means including surface means for defining an opening through which a plug of an adjacent link can be inserted into said socket means when said body section of said one link and the adjacent link are in a first orientation relative to each other and for blocking withdrawal of a plug of an adjacent link from said socket means when said body section of said one link and the adjacent link are in a second orientation relative to each other, said body section of said one link and said one gripper means being rotatable together relative to said track between the first and second orientations, said track including wall means for at least partially enclosing said conveyor chain and for defining a slot through which said one link and said one gripper means are interconnected, said slot including surface means for preventing rotation of said links from the second orientation to the first orientation during movement of said links along said track, said wall means including surface means at least partially defining an opening for enabling said body section of said one link and said one gripper means to be rotated together about the longitudinal axis of said track at the opening from the second orientation to the first orientation and longitudinally disconnected from the adjacent links and laterally moved through the opening while the adjacent links are enclosed by said track.

2. A gripper conveyor assembly as set forth in claim 1 wherein said roller means includes first and second rollers disposed on opposite sides of said body section and rotatable about an axis extending perpendicular to the longitudinal axis of said track, said wall means including a side wall in which the slot is formed, said body section being oriented with the axis of rotation of said roller means extending perpendicular to said sidewall when said body section is in the second orientation, said body section being oriented with the axis of rotation of said roller means extending parallel to said side wall when said body section is in the first orientation.

3. A gripper conveyor assembly as set forth in claim 1 wherein said wall means of said track includes a central wall in which the slot is formed and a pair of side walls connected with opposite sides of the central wall, said opening extending from the slot through at least a major portion of one of the side walls to enable said body section and said one gripper means to be rotated together at the opening in said track to release said plug and socket on said body section for disconnection from a socket and plug on body sections of adjacent links.

4. A gripper conveyor assembly as set forth in claim 1 wherein said body section, socket means and plug of said one link are cast as one piece.

* * * * *